(12) United States Patent
Hsu

(10) Patent No.: US 11,659,073 B1
(45) Date of Patent: May 23, 2023

(54) HINGE

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/698,686

(22) Filed: Mar. 18, 2022

(30) Foreign Application Priority Data

Oct. 28, 2021 (TW) .................................. 110140031

(51) Int. Cl.
| G06F 1/16 | (2006.01) |
|---|---|
| H04M 1/02 | (2006.01) |
| F16C 11/04 | (2006.01) |

(52) U.S. Cl.
CPC ........... *H04M 1/0216* (2013.01); *F16C 11/04* (2013.01)

(58) Field of Classification Search
CPC .............................. H04M 1/0216; F16C 11/04
See application file for complete search history.

(56) References Cited

U.S. PATENT DOCUMENTS

| 10,480,225 | B1* | 11/2019 | Hsu | ............................ E05D 3/12 |
|---|---|---|---|---|
| 11,459,809 | B1* | 10/2022 | Hsu | ........................ E05D 3/122 |
| 11,473,356 | B1* | 10/2022 | Hsu | ............................ E05D 3/14 |
| 2017/0257961 | A1* | 9/2017 | Chen | ...................... G06F 1/1681 |
| 2020/0097051 | A1* | 3/2020 | Liu | ....................... G06F 1/1652 |
| 2021/0051810 | A1* | 2/2021 | Hsu | ...................... G06F 1/1681 |
| 2021/0271294 | A1* | 9/2021 | Liao | ..................... H04B 1/3827 |
| 2022/0141981 | A1* | 5/2022 | Hsu | ....................... G06F 1/1652 |
| | | | | 16/337 |
| 2022/0365569 | A1* | 11/2022 | Hsu | ........................ F16C 11/04 |
| 2022/0365570 | A1* | 11/2022 | Hsu | ...................... G06F 1/1681 |
| 2022/0390989 | A1* | 12/2022 | Hsu | ...................... G06F 1/1681 |
| 2023/0063210 | A1* | 3/2023 | Hsu | ....................... G06F 1/1652 |

* cited by examiner

*Primary Examiner* — Jason W San
(74) *Attorney, Agent, or Firm* — Burris Law, PLLC

(57) ABSTRACT

A hinge includes a fixed seat, and two symmetrically-disposed support modules that are convertible between an unfolded state and a folded state. Each of the support modules includes a sliding pivot arm that is slidable and pivotable with respect to the fixed seat, a pivot guide unit that is movably engaged with the sliding pivot arm, and a slide block that has a slide slot movably engaged with the sliding pivot arm, and an oblique sliding portion movably engaged with the pivot guide unit, such that the slide block is slidable with respect to the sliding pivot arm and the pivot guide unit when the support modules are converted between the unfolded state and the folded state.

9 Claims, 15 Drawing Sheets

HINGE

CROSS-REFERENCE TO RELATED APPLICATION

This application claims priority of Taiwanese Patent Application No. 110140031, filed on Oct. 28, 2021.

FIELD

The disclosure relates to a hinge, and more particularly to a hinge for use with a foldable electronic device having a flexible display.

BACKGROUND

In general, a conventional foldable electronic device is mounted with a hinge that enables two casings to be folded and unfolded relative to each other, and that is used to support a flexible display. In terms of the position of the flexible display (i.e., being disposed inside or outside when the casings are folded), the conventional foldable electronic devices are mainly categorized as inward-folding and outward-folding devices.

For a conventional inward-folding device, when the casings are folded, the flexible display is bent into a U-shape between the casings. As such, sufficient space is required between the folded casings in order to prevent a bent portion of the flexible display from being cramped and damaged, which often results in a design with relatively great thickness when the casings are folded.

SUMMARY

Therefore, the object of the disclosure is to provide a hinge that can alleviate the drawback of the prior art.

According to the disclosure, a hinge is adapted to be connected between two casings, and includes a fixed seat and two symmetrically-disposed support modules. The fixed seat includes two seat bodies that are connected side by side along a first direction. Each of the seat bodies has an inner side surface that faces the other one of the seat bodies and that is formed with two symmetric tracks arranged along a second direction perpendicular to the first direction. The support modules are arranged along the second direction, flank and are movably connected to the fixed seat, and are convertible with respect to each other between an unfolded state and a folded state. Each of the support modules includes a pivot guide unit and a sliding unit.

The pivot guide unit is pivotally connected to the fixed seat, and has a bearing surface facing outwardly, and an oblique guide rail extending obliquely with respect to the bearing surface. The sliding unit has a sliding pivot arm and a slide block. The sliding pivot arm has a sliding shaft, an orthogonal guide portion that is spaced apart from the sliding shaft along the second direction, and an arm body that extends along the second direction and that is connected between the sliding shaft and the orthogonal guide portion. The sliding shaft extends along the first direction and is movably received in a pair of the tracks of the seat bodies that are opposite to each other along the first direction, such that the sliding pivot arm is slidable with respect to the seat bodies of the fixed seat and is pivotable about the sliding shaft. The slide block is adapted to be connected to the pivot guide unit and a respective one of the casings, and has a block body, a slide slot that is formed in the block body for receiving the orthogonal guide portion and a portion of the arm body of the sliding pivot arm, and an oblique sliding portion that is formed on the block body and that is movably engaged with and complementary in shape with the oblique guide rail of the pivot guide unit. The slide block is slidable with respect to the sliding pivot arm along a direction perpendicular to the bearing surface via engagement between the orthogonal guide portion and the slide slot, and is slidable with respect to the pivot guide unit along a direction oblique to the bearing surface via engagement between the oblique guide rail and the oblique sliding portion.

When the support modules are converted from the unfolded state to the folded state, the sliding pivot arm of each of the support modules slides and pivots with respect to the fixed seat such that the sliding shafts of the sliding pivot arms of the support modules move away from each other, and the orthogonal guide portions of the sliding pivot arms of the support modules move towards each other, and the oblique sliding portions of the support modules slide respectively on the oblique guide rails of the pivot guide unit, so that the slide blocks of the support modules move toward each other.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
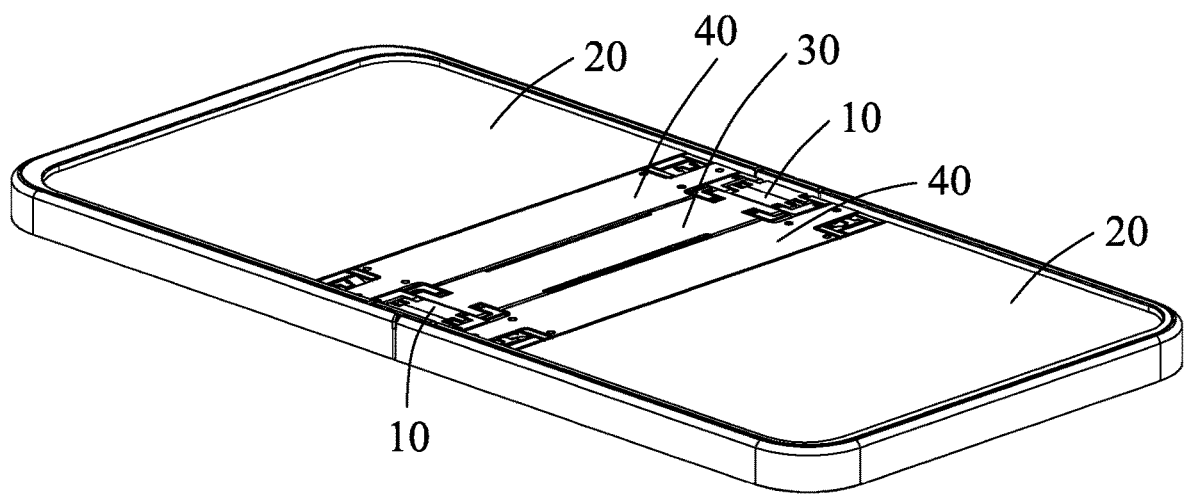
FIG. 1 is a perspective view illustrating an embodiment of a hinge according to the disclosure being connected to two casings, a synchronous mechanism and two carrier boards.
Figure 2:
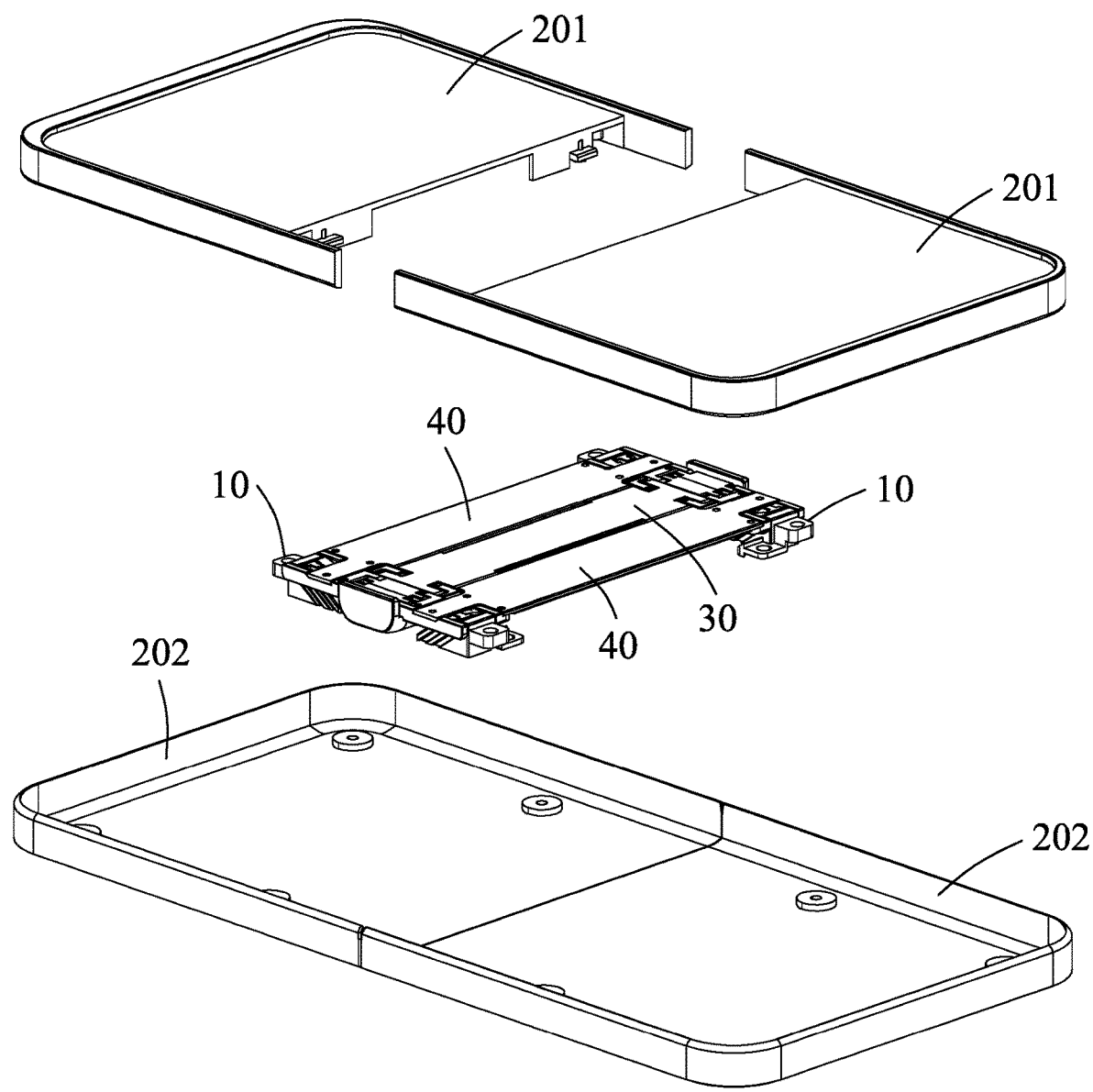
FIG. 2 is a partially exploded perspective view corresponding to FIG. 1.
Figure 3:
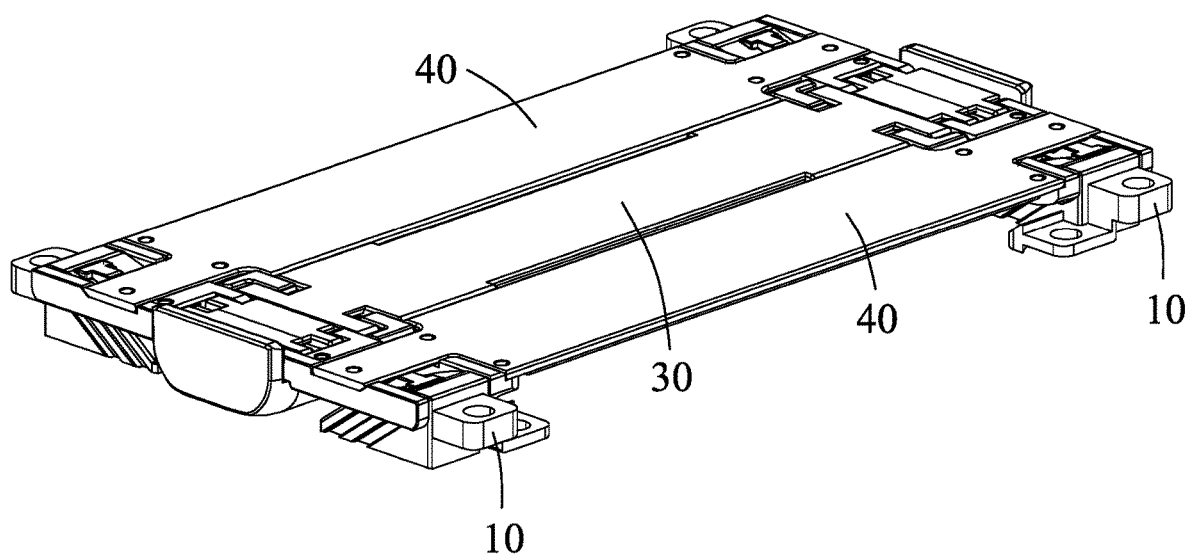
FIG. 3 is a perspective view illustrating the embodiment, the synchronous mechanism and the carrier boards.
Figure 4:
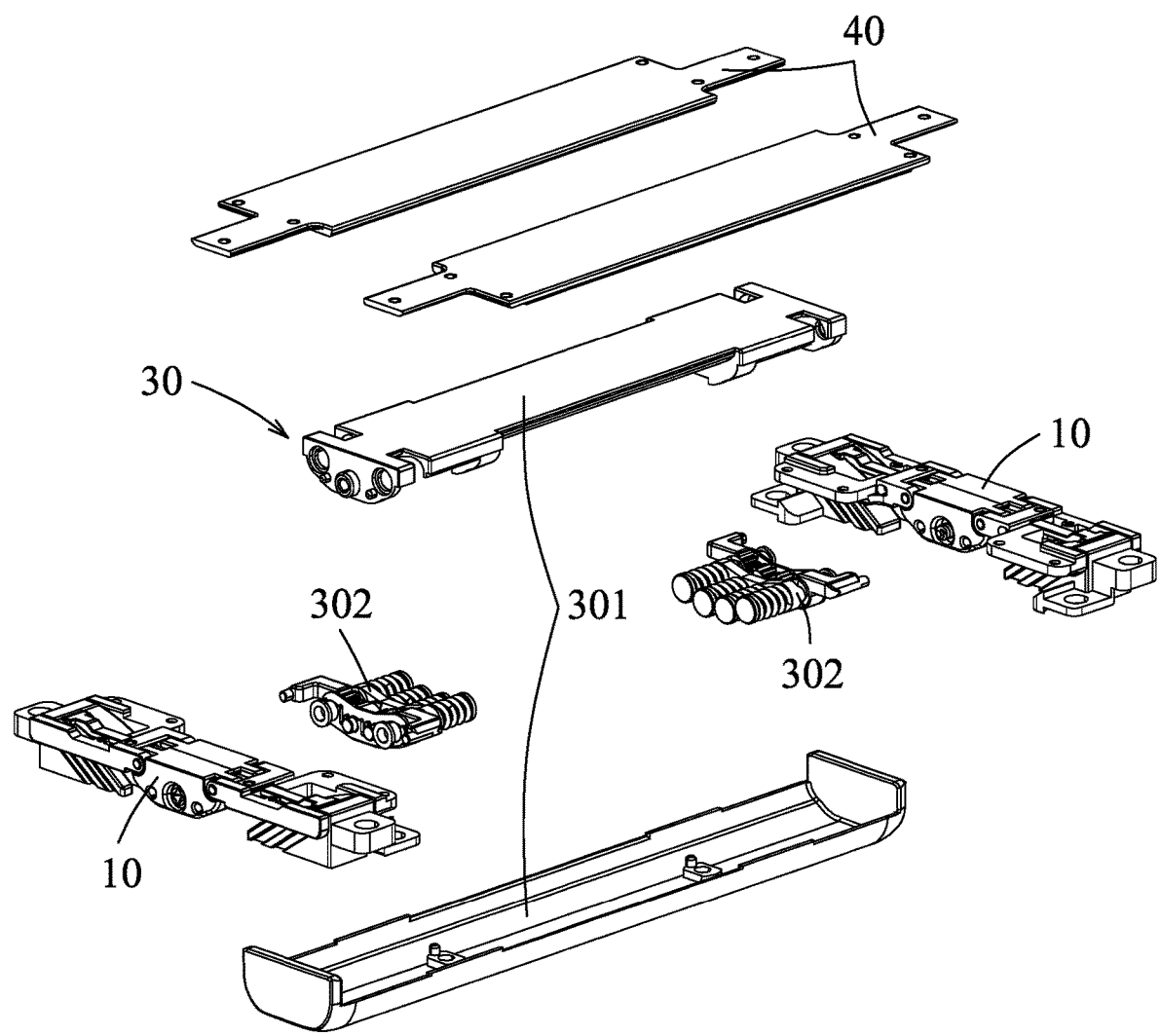
FIG. 4 is a partially exploded perspective view corresponding to FIG. 3.

Referring to FIGS. 1 to 4, an embodiment of a hinge 10 according to the disclosure is adapted to be connected between two casings 20 to cooperatively support a flexible display (not shown). In the present embodiment, two of the hinges 10 are used to be connected between the casings 20. Specifically, each of the casings 20 includes an inner case 201 and an outer case 202 that are assembled together, and each of the hinges 10 is adapted to be connected between the inner cases 201 of the casings 20. The hinges 10 are connected to each other by a synchronous mechanism 30 and two carrier boards 40. The synchronous mechanism 30 includes a shaft seat 301 and two torsion units 302 for synchronizing movement of the hinges 10. The carrier boards 40 are used to cooperate with the inner cases 201 to support the flexible display. It should be noted that, for the sake of brevity, only one of the hinges 10 is described in detail hereinafter.

Figure 5:
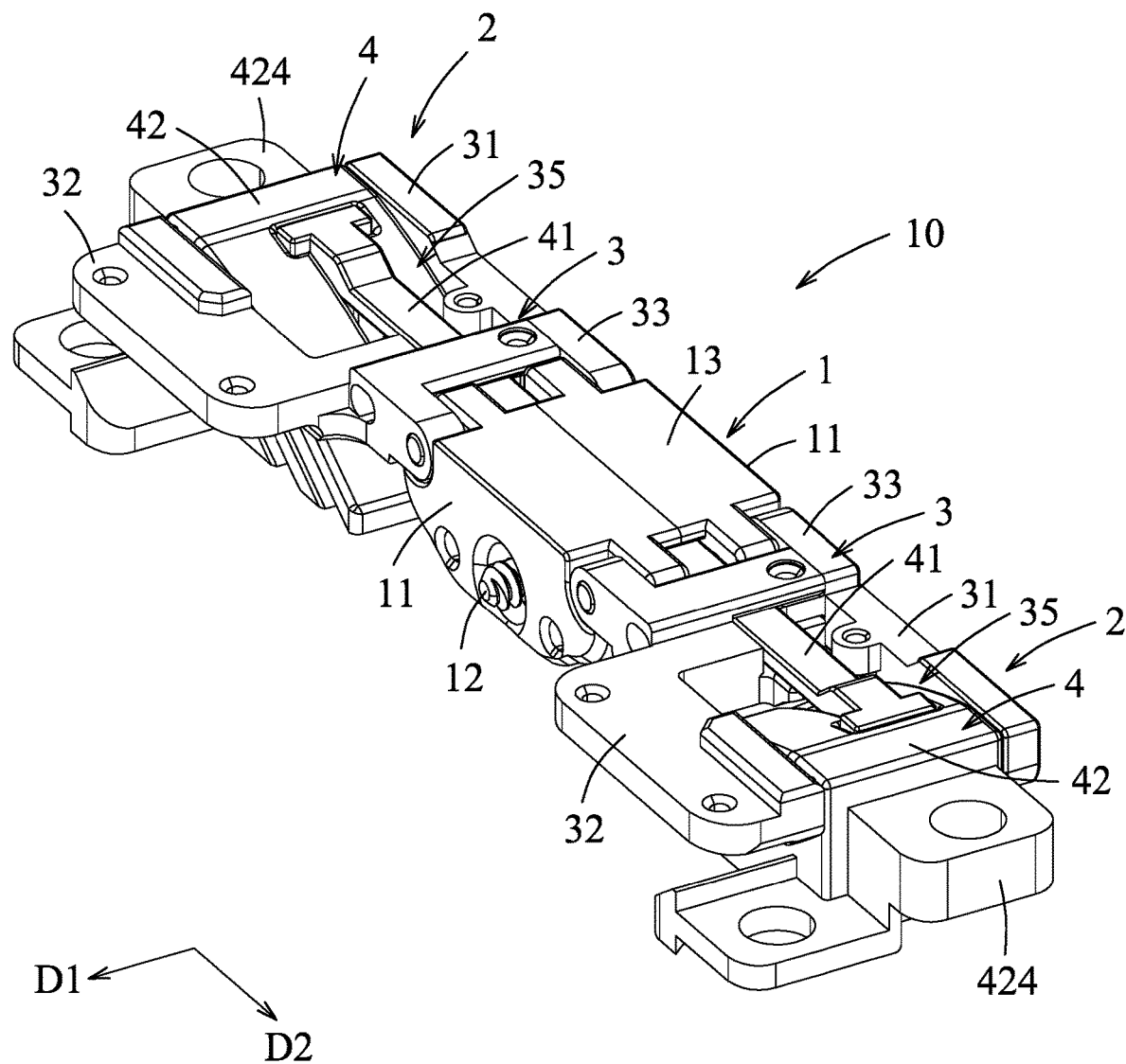
FIG. 5 is a perspective view of the embodiment.
Figure 6:
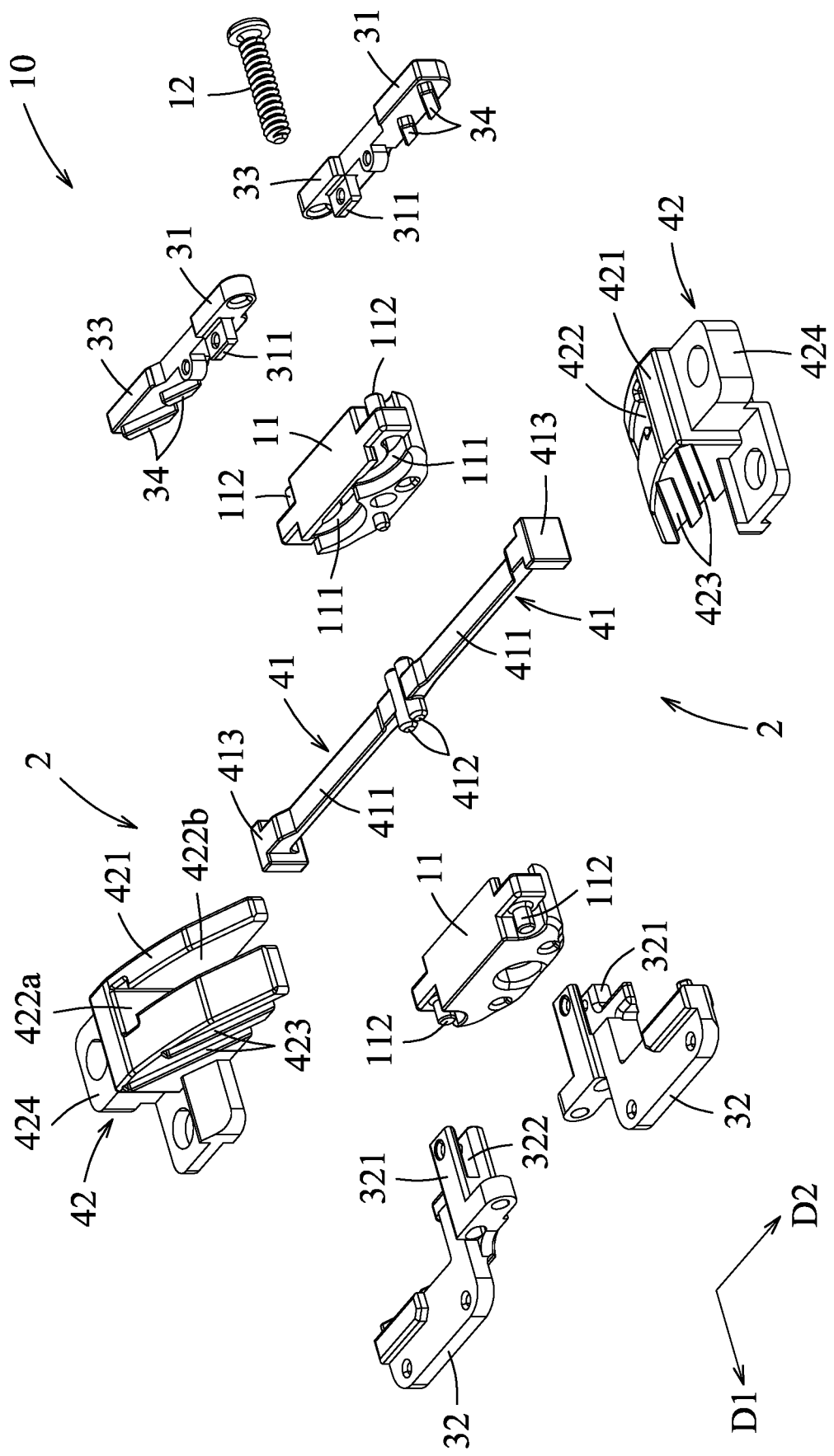
FIG. 6 is an exploded perspective view of the embodiment.
Figure 7:
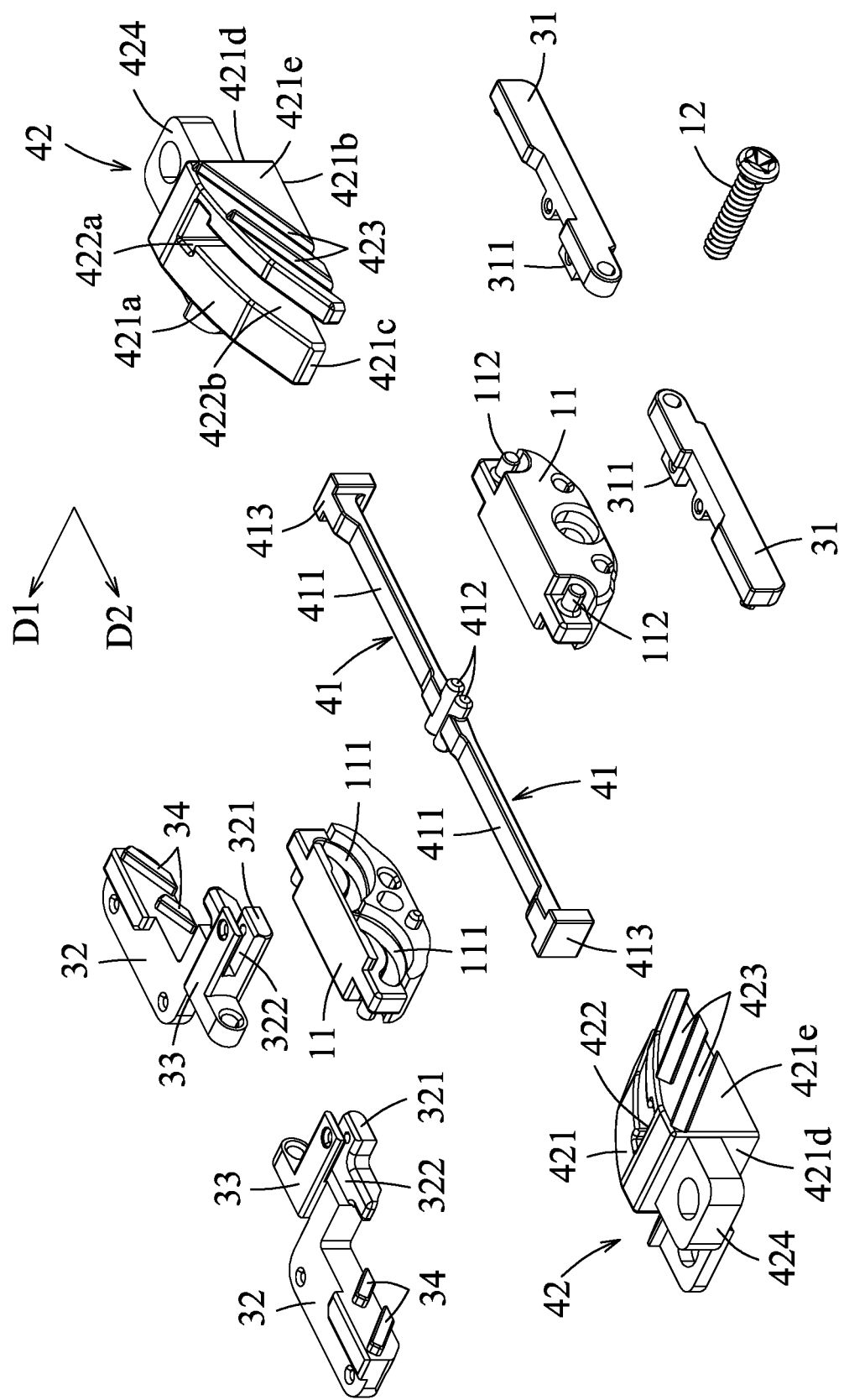
FIG. 7 is another exploded perspective view of the embodiment.

Referring to FIGS. 5 to 7, the hinge 10 includes a fixed seat 1 and two symmetrically-disposed support modules 2.

The fixed seat 1 includes two seat bodies 11 that are connected side by side along a first direction (D1). Each of the seat bodies 11 has an inner side surface that faces the other one of the seat bodies 11 and that is formed with two symmetric tracks 111 arranged along a second direction (D2) perpendicular to the first direction (D1), and an outer side surface that faces away from the other one of the seat bodies 11 and that is formed with two columns 112. The seat bodies 11 are fixed together by a fastener 12 to cooperatively define a top surface 13.

Figure 14:
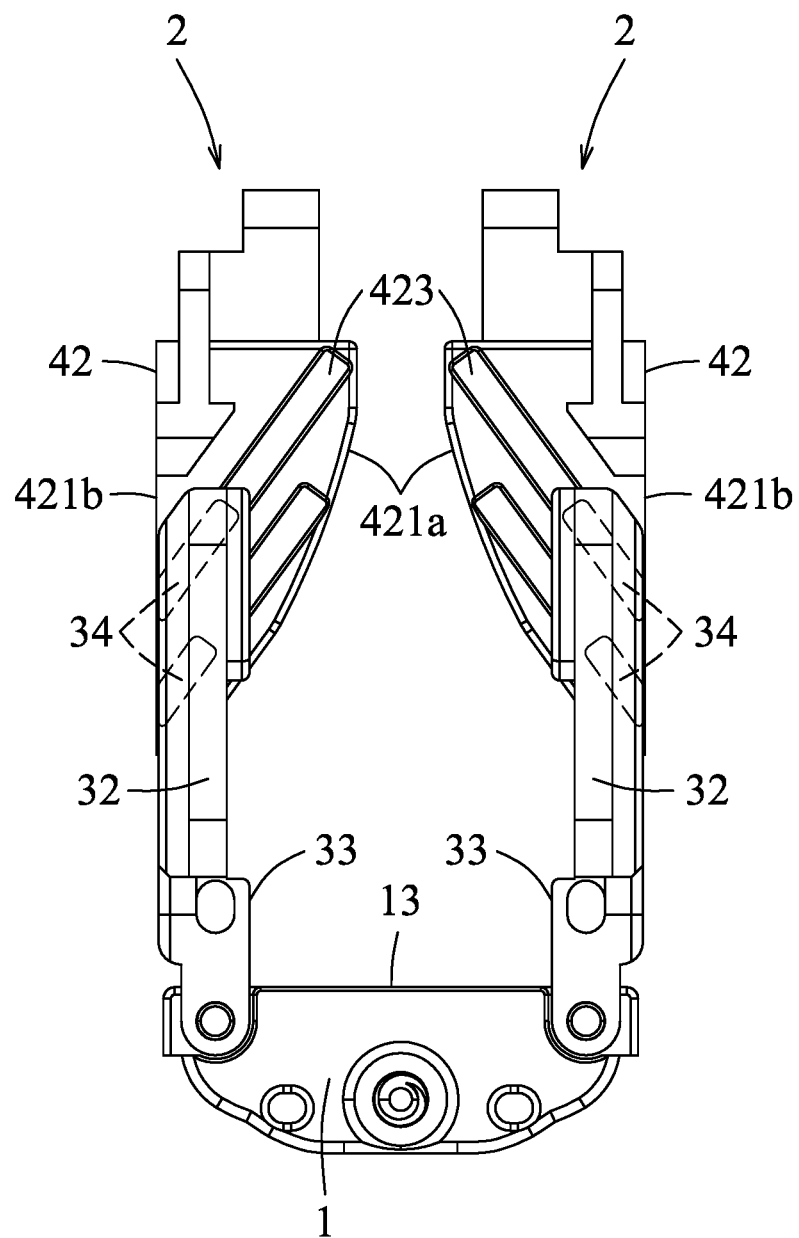
FIG. 14 is a left side view of the embodiment when the support modules are in the folded state.

The support modules 2 are arranged along the second direction (D2), flanks and are movably connected to the fixed seat 1, and are convertible with respect to each other between an unfolded state (see FIG. 5) and a folded state (see FIG. 14). Each of the support modules 2 includes a pivot guide unit 3 and a sliding unit 4.

The pivot guide unit 3 of each of the support modules 2 includes a first pivotal member 31 and a second pivotal member 32 that are pivotally connected to the seat bodies 11 of the fixed seat 1, respectively, and that are connected to each other to be pivotable relative to the seat bodies 11 in a synchronous manner. Specifically, the first pivotal member 31 of each of the support modules 2 has one end that is pivotally connected to a respective one of the pivot shafts 112 of one of the seat bodies 11, and has a first connecting portion 311 that is proximal to the fixed seat 1. The second pivotal member 32 of each of the support modules 2 has one end that is pivotally connected to a respective one of the pivot shafts 112 of the other one of the seat bodies 11, and has a second connecting portion 321 that is connected to the first connecting portion 311.

The first pivotal member 31 and the second pivotal member 32 of each of the support modules 2 cooperate with each other to form a bearing surface 33 and an oblique guide rail 34, and define a receiving space 35 therebetween. In the present embodiment, the bearing surface 33 of each of the support modules 2 faces outwardly, and is coplanar with the top surface 13 of the fixed seat 1 when the support modules 2 are in the unfolded state. The oblique guide rail 34 of each of the support modules 2 extends obliquely with respect to the bearing surface 33, and is configured as a plurality of parallel rib-shaped protrusions that are formed on inner sides of the first pivotal member 31 and the second pivotal member 32, and that extend obliquely with respect to the bearing surface 33.

Figure 9:
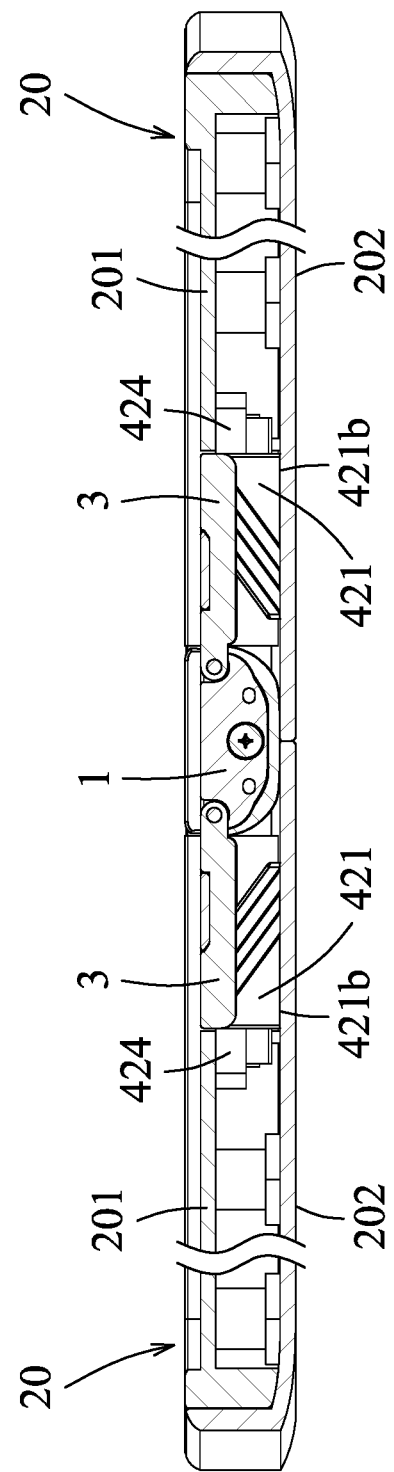
FIG. 9 is a fragmentary cross-sectional view illustrating two support modules of the embodiment in an unfolded state.

The sliding unit 4 of each of the support modules 2 has a sliding pivot arm 41, and a slide block 42 that is adapted to be connected to the pivot guide unit 3 and a respective one of the casings 20 (see FIG. 9). The sliding pivot arm 41 has a sliding shaft 412, an orthogonal guide portion 413 that is spaced apart from the sliding shaft 412 along the second direction (D2), and an arm body 411 that extends along the second direction (D2) and that is connected between the sliding shaft 412 and the orthogonal guide portion 413.

In the present embodiment, the arm body 411 of the sliding pivot arm 41 has an elongated shape, and the second connecting portion 321 of the second pivotal member 32 of each of the support modules 2 is formed with a slot 322 that is provided for the arm body 411 of the sliding pivot arm 41 to extend therethrough and for receiving the first connecting portion 311 of the first pivotal member 31, such that the arm body 411 of the sliding pivot arm 41 is disposed between and linearly movable between the first connecting portion 311 of first pivotal member 31 and the second connecting portion 321 of the second pivotal member 32 along a longitudinal direction of the arm body 411. It should be noted that, movement of the arm body 411 of the sliding pivot arm 41 along the first direction (D1) is prevented by the first connecting portion 311 of first pivotal member 31 and the second connecting portion 321 of the second pivotal member 32.

The sliding shaft 412 of the sliding pivot arm 41 extends along the first direction (D1) and is movably received in a pair of the tracks 111 of the seat bodies 11 that are aligned with each other along the first direction (D1), such that the sliding pivot arm 41 is slidable with respect to the seat bodies 11 of the fixed seat 1 and is pivotable about the sliding shaft 412.

The orthogonal guide portion 413 of the sliding pivot arm 41 is rectangular, and a width of the orthogonal guide portion 413 along the first direction (D1) is greater than that of the arm body 411 of the sliding pivot arm 41.

The slide block 42 is disposed between the first pivotal member 31 and the second pivotal member 32, is received in the receiving space 35, and has a block body 421, a slide slot 422, an oblique sliding portion 423 and a case connecting portion 424.

The slide slot 422 of the slide block 42 is formed in the block body 421 for receiving the orthogonal guide portion 413 and a portion of the arm body 411 of the sliding pivot arm 41. The oblique sliding portion 423 of the slide block 42 is formed on the block body 421 and is movably engaged with and complementary in shape with the oblique guide rail 34 of the pivot guide unit 3. The case connecting portion 424 of the slide block 42 is connected to the block body 421, is disposed outside of the receiving space 35 of the pivot guide unit 3, and is adapted to be connected to the corresponding casing 20.

As such, the slide block 42 is slidable with respect to the sliding pivot arm 41 along a direction perpendicular to the bearing surface 33 of the pivot guide unit 3 via engagement between the orthogonal guide portion 413 and the slide slot 422, and is slidable with respect to the pivot guide unit 3 along a direction oblique to the bearing surface 33 via engagement between the oblique guide rail 34 and the oblique sliding portion 423.

Specifically, the block body 421 of the slide block 42 has an arc-shaped top abutment surface 421a, a bottom abutment surface 421b opposite to the top abutment surface 421a, a first end surface 421c, a second end surface 421d and two side surfaces 421e. The first end surface 421c is connected between the top abutment surface 421a and the bottom abutment surface 421b, and is proximate to the fixed seat 1. The second end surface 421d is opposite to the first end surface 421c along the second direction (D2), and is distal from the fixed seat 1. The side surfaces 421e are opposite to each other along the first direction (D1), and are formed with the oblique sliding portion 423. A distance between the top abutment surface 421a and the bottom abutment surface 421b gradually decreases along the first direction (D1) from the second end surface 421d to the first end surface 421c.

In the present embodiment, the slide slot 422 of the slide block 42 has a limit section 422a and an extending section 422b. The limit section 422a is proximal to the second end surface 421d, and extends through the top abutment surface 421a and the bottom abutment surface 421b along the direction perpendicular to the bearing surface 33. The extending section 422b is distal from the second end surface 421d, and extends through the top abutment surface 421a, the bottom abutment surface 421b and the first end surface 421c. A width of the limit section 422a along the first direction (D1) is greater than that of the extending section 422b. The orthogonal guide portion 413 and the arm body 411 of the sliding pivot arm 41 are received in the limit section 422a and the extending section 422b of the slide block 42, respectively.

The oblique sliding portion 423 of the slide block 42 is configured as a plurality of elongated grooves that are formed in the side surfaces 421e of the block body 421, and that extend obliquely with respect to the bearing surface 33 for receiving the rib-shaped protrusions of the oblique guide rail 34, respectively. The case connecting portion 424 of the slide block 42 is connected to the second end surface 421d of the block body 421.

Figure 8:
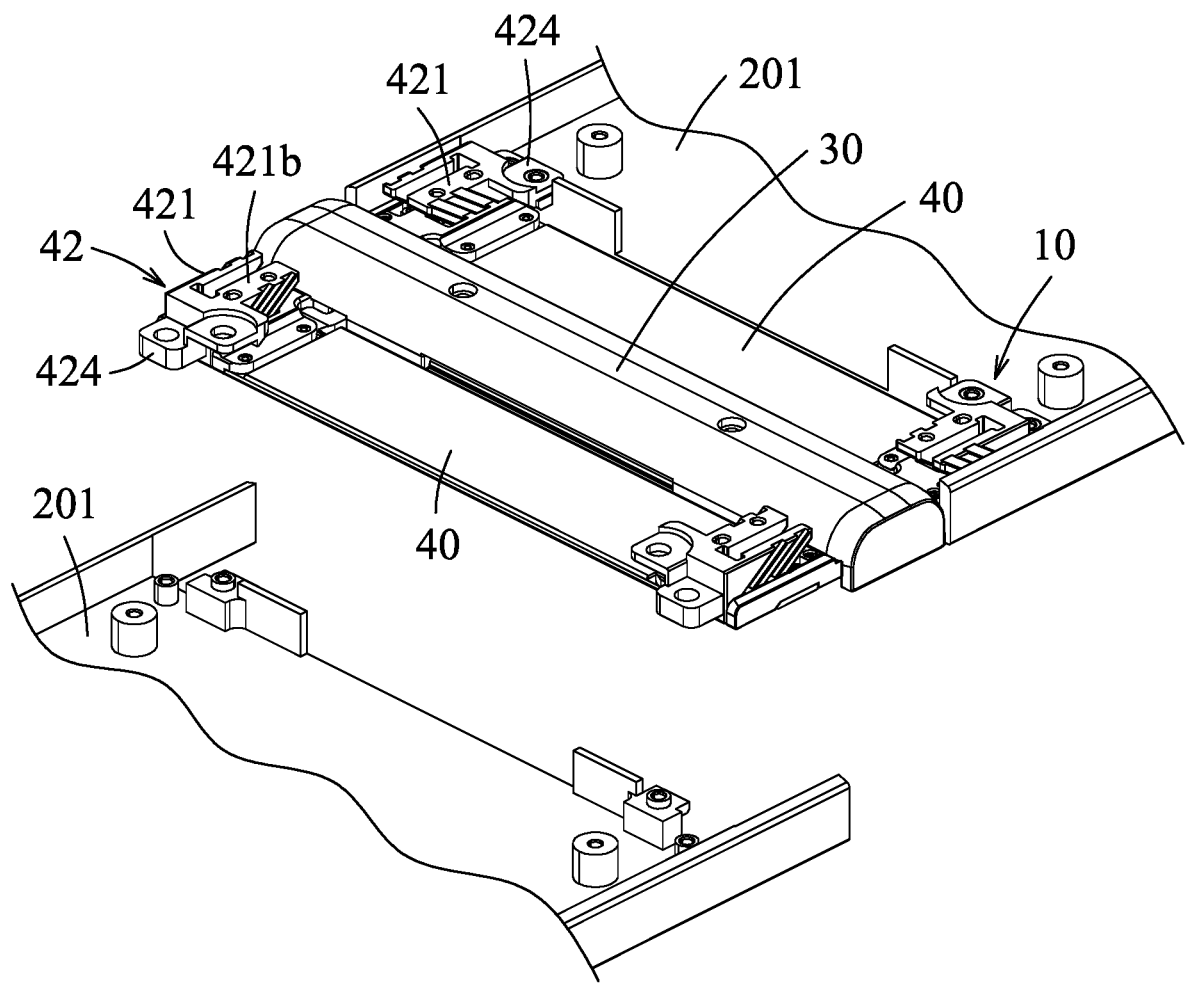
FIG. 8 is a fragmentary and partially exploded perspective view of the embodiment, the casings, the synchronous mechanism and the carrier boards.
Figure 10:
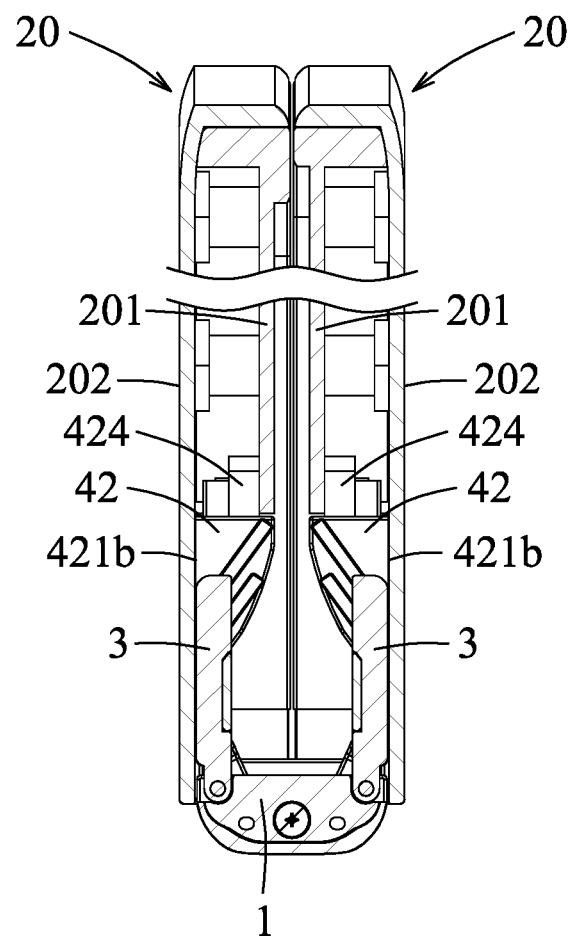
FIG. 10 is a fragmentary cross-sectional view illustrating the support modules of the embodiment in a folded state.

Referring to FIGS. 8 to 10, for each of the support modules 2, the case connecting portion 424 of the slide block 42 is adapted be connected to the inner case 201 of the corresponding one of the casings 20, such that the slide block 42 is adapted to follow movement of the inner case 201. Since the inner case 201 and the outer case 202 of each of the casings 20 are fixedly assembled together, the slide block 42, the inner case 201 and the outer case 202 are co-movable during conversion of the support modules 2 between the folded and unfolded states, and the bottom abutment surface 421b of the block body 421 of the slide block 42 is adapted to abut against an inner surface of the outer case 202.

Figure 11:
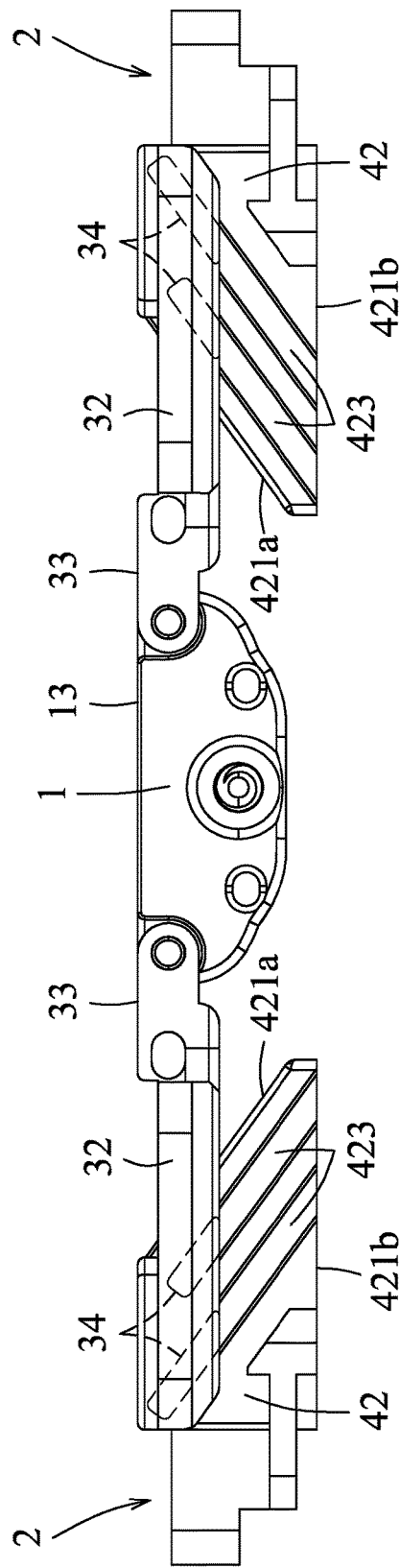
FIG. 11 is a left side view of the embodiment when the support modules are in the unfolded state.
Figure 12:
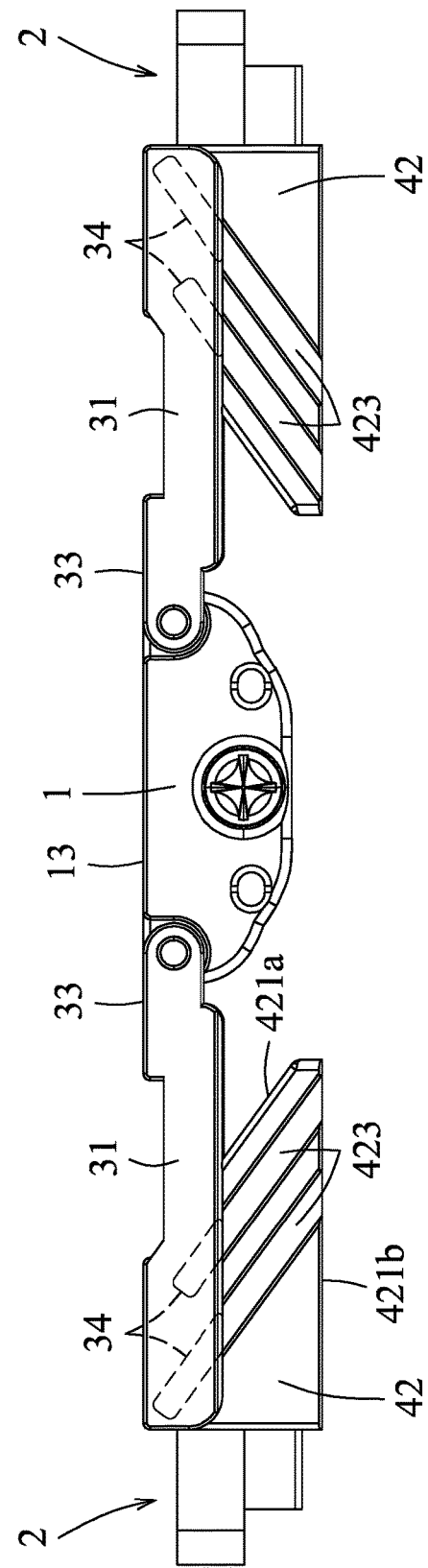
FIG. 12 is a right side view of the embodiment when the support modules are in the unfolded state.
Figure 13:
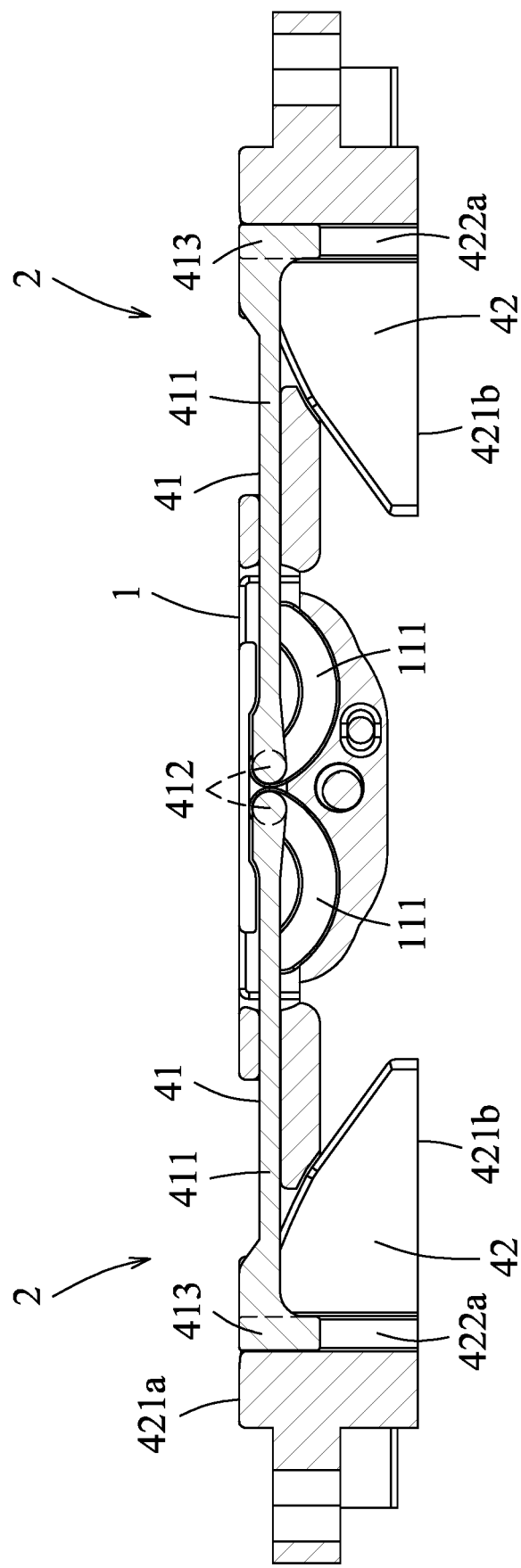
FIG. 13 is a cross-sectional view of the embodiment when the support modules are in the unfolded state.

Referring to FIGS. 11 to 13, when the support modules 2 are in the unfolded state, the top abutment surface 421a of the sliding unit 4 of each of the support modules 2 does not intersect with an imaginary plane flush with the bearing surface 33 of the corresponding pivot guide unit 3, and the bearing surfaces 33 are coplanar with the top surface 13 of the fixed seat 1. The sliding shaft 412 of the sliding pivot arm 41 of each of the support modules 2 is disposed at inner ends of two corresponding tracks 111 of the seat bodies 11 such that the two sliding shafts 412 of the support modules 2 are proximal to each other. The orthogonal guide portion 413 of the sliding pivot arm 41 of each of the support modules 2 is disposed at an end of the limit section 422a of the slide block 42 proximal to the top abutment surface 421a, and the oblique guide rail 34 (i.e., the rib-shaped protrusions) of the pivot guide unit 3 of each of the support modules 2 is disposed at an end of the oblique sliding portion 423 (i.e., ends of the elongated grooves) of the slide block 42 proximal to the top abutment surface 421a.

Figure 15:
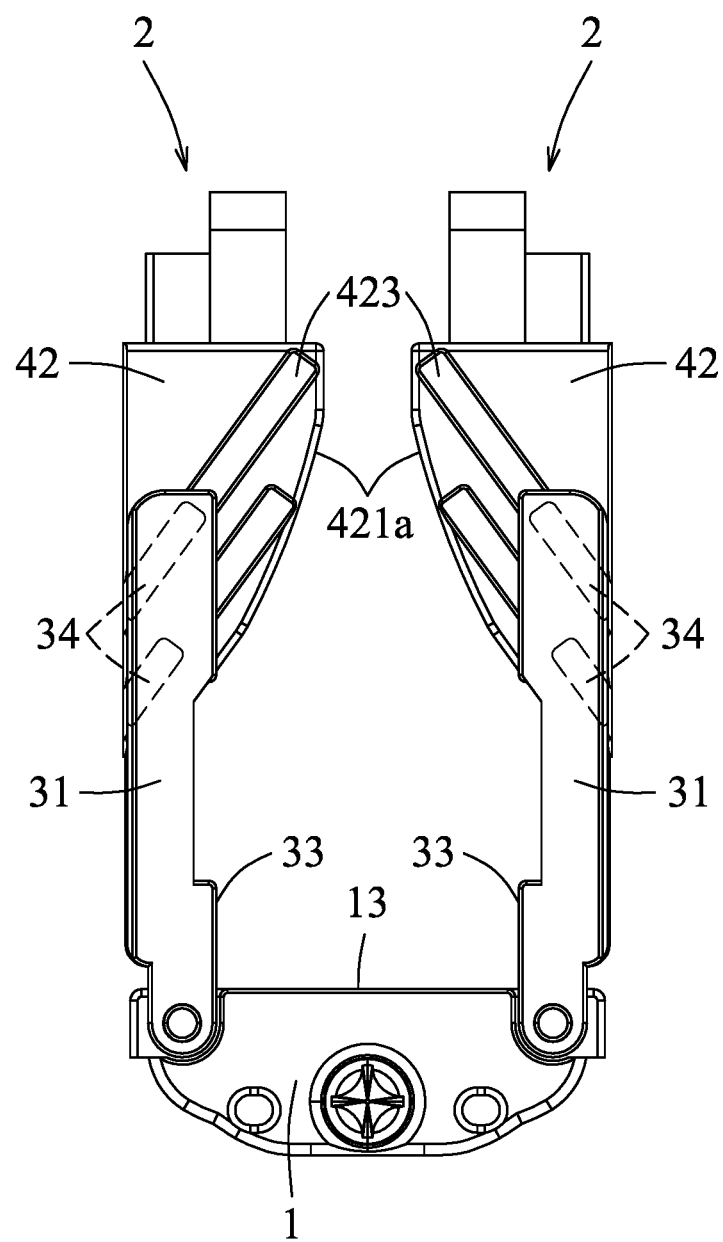
FIG. 15 is a right side view of the embodiment when the support modules are in the folded state.
Figure 16:
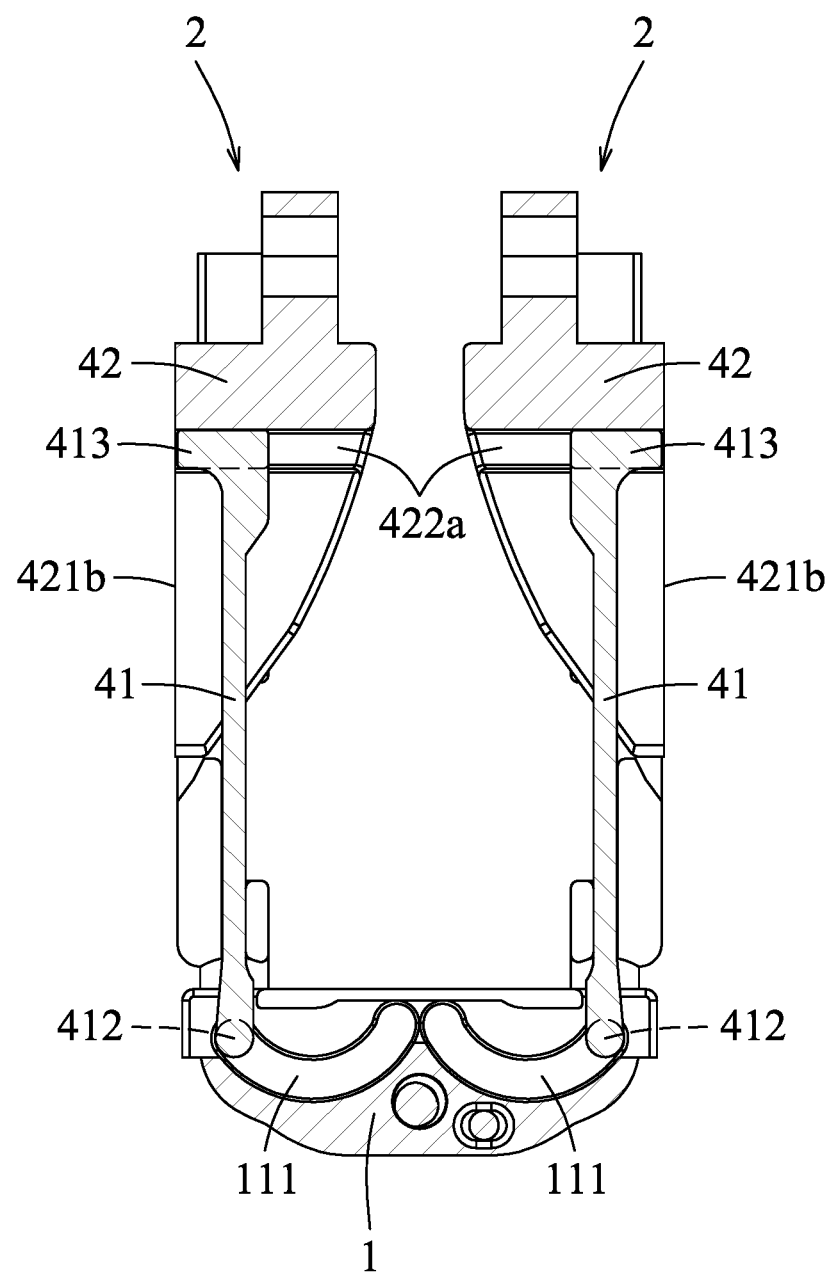
FIG. 16 is a cross-sectional view of the embodiment when the support modules are in the folded state.

Referring to FIGS. 14 to 16, when the support modules 2 are converted from the unfolded state to the folded state, the sliding pivot arm 41 of each of the support modules 2 slides and pivots with respect to the fixed seat 1 such that the sliding shafts 412 of the sliding pivot arms 41 of the support modules 2 move away from each other (along the tracks 111 of the seat bodies 11), and the orthogonal guide portions 413 of the sliding pivot arms 41 of the support modules 2 move towards each other (within the limit sections 422a of the slide blocks 42), and the oblique sliding portions 423 of the support modules 2 slide respectively on the oblique guide rails 34 of the pivot guide units 3, so that the slide blocks 42 of the support modules 2 move toward each other (along the directions perpendicular to the bearing surface 33 of the pivot guide unit 3).

When the support modules 2 are in the folded state, the top abutment surface 421a of the sliding unit 4 of each of the support modules 2 intersects with the imaginary plane flush with the bearing surface 33 of the corresponding pivot guide unit 3, and the top abutment surfaces 421a of the sliding units 4 of the support modules 2 become proximal to each other. The sliding shaft 412 of the sliding pivot arm 41 of each of the support modules 2 is disposed at outer ends of two corresponding tracks 111 of the seat bodies 11 such that the sliding shafts 412 of the support modules 2 are distal from each other. The orthogonal guide portion 413 of the sliding pivot arm 41 of each of the support modules 2 is disposed at an end of the limit section 422a of the slide block 42 proximal to the bottom abutment surface 421b, and the oblique guide rail 34 of the pivot guide unit 3 of each of the support modules 2 is disposed at an end of the oblique sliding portion 423 of the slide block 42 proximal to the bottom abutment surface 421b.

It should be noted that, during the conversion of the support modules 2 from the unfolded state to the folded state, by virtue of the engagement between the orthogonal guide portion 413 of the sliding pivot arm 41 and the slide slot 422 of the slide block 42 of each of the support modules 2, and the engagement between the oblique guide rail 34 of the pivot guide unit 3 and the oblique sliding portion 423 of the slide block 42 of each of the support modules 2, the slide blocks 42 are driven to move in a manner to reduce a gap between the casings 20 (see FIGS. 9 and 10), thereby minimizing an overall thickness of the casings 20 in the folded state. Furthermore, by virtue of the configuration of the top abutment surface 421a of each of the slide blocks 42 (i.e., the distance between the top abutment surface 421a and the bottom abutment surface 421b gradually decreases along the first direction (D1) from the second end surface 421d to the first end surface 421c), when the support modules 2 are in the folded state, the slide blocks 42, the pivot guide units 3 and the fixed seat 1 cooperatively define a droplet-shaped space (see FIGS. 14 and 15) for accommodating a bent portion of the flexible display (not shown), which prevents the bent portion of the flexible display from being cramped and damaged.

In sum, by virtue of the movements of the pivot guide units 3, the sliding pivot arms 41 and the slide blocks 42 of the support modules 2 that are interrelated to each other as mentioned above, the overall thickness of the casings 20 can be minimized without the risk of damaging the flexible display.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge adapted to be connected between two casings, and comprising:
    a fixed seat including two seat bodies that are connected side by side along a first direction, each of said seat bodies having an inner side surface that faces the other one of said seat bodies and that is formed with two symmetric tracks arranged along a second direction perpendicular to the first direction; and
    two symmetrically-disposed support modules being arranged along the second direction, flanking and movably connected to said fixed seat, and being convertible with respect to each other between an unfolded state and a folded state, each of said support modules including
        a pivot guide unit that is pivotally connected to said fixed seat, and that has a bearing surface facing outwardly, and an oblique guide rail extending obliquely with respect to said bearing surface, and
        a sliding unit that has
            a sliding pivot arm having a sliding shaft, an orthogonal guide portion that is spaced apart from said sliding shaft along the second direction, and an arm body that extends along the second direction and that is connected between said sliding shaft and said orthogonal guide portion, said sliding shaft extending along the first direction and being movably received in a pair of said tracks of said seat bodies that are aligned with each other along the first direction, such that said sliding pivot arm is slidable with respect to said seat bodies of said fixed seat and is pivotable about said sliding shaft, and
            a slide block adapted to be connected to said pivot guide unit and a respective one of the casings, and having a block body, a slide slot that is formed in said block body for receiving said orthogonal guide portion and a portion of said arm body of said sliding pivot arm, and an oblique sliding portion that is formed on said block body and that is movably engaged with and complementary in shape with said oblique guide rail of said pivot guide unit, said slide block being slidable with respect to said sliding pivot arm along a direction perpendicular to said bearing surface via engagement between said orthogonal guide portion and said slide slot, and being slidable with respect to said pivot guide unit along a direction oblique to said bearing surface via engagement between said oblique guide rail and said oblique sliding portion;
    wherein when said support modules are converted from the unfolded state to the folded state, said sliding pivot arm of each of said support modules slides and pivots with respect to said fixed seat such that said sliding shafts of said sliding pivot arms of said support modules move away from each other, and said orthogonal guide portions of said sliding pivot arms of said support modules move towards each other, and said oblique sliding portions of said support modules slide respectively on said oblique guide rails of said pivot guide unit, so that said slide blocks of said support modules move toward each other.

2. The hinge as claimed in claim 1, wherein:
    for each of said support modules, said block body of said slide block of said sliding unit has an arc-shaped top abutment surface, a bottom abutment surface that is opposite to said top abutment surface, a first end surface that is connected between said top abutment surface and said bottom abutment surface and that is proximate to said fixed seat, a second end surface that is opposite to said first end surface along the second direction and that is distal from said fixed seat, and two side surfaces that are opposite to each other along the first direction and that are formed with said oblique sliding portion, a distance between said top abutment surface and said bottom abutment surface gradually decreasing along the first direction from said second end surface to said first end surface; and
    when said support modules are in the unfolded state, said top abutment surface of said sliding unit of each of said support modules does not intersect with an imaginary plane flush with said bearing surface of a corresponding one of said pivot guide units, and when said support modules are in the folded state, said top abutment surface of said sliding unit of each of said support modules intersects with the imaginary plane flush with said bearing surface of the corresponding one of said pivot guide units, and said top abutment surfaces of said sliding units of said support modules become proximal to each other.

3. The hinge as claimed in claim 2, wherein for said sliding unit of each of said support modules:
    said orthogonal guide portion of said sliding pivot arm is rectangular, a width of said orthogonal guide portion along the first direction being greater than that of said arm body of said sliding pivot arm; and
    said slide slot of said slide block has a limit section that is proximal to said second end surface and that extends through said top abutment surface and said bottom abutment surface along the direction perpendicular to said bearing surface, and an extending section that is distal from said second end surface and that extends through said top abutment surface, said bottom abutment surface and said first end surface, a width of said limit section along the first direction being greater than that of said extending section, said orthogonal guide portion and said arm body of said sliding pivot arm being received in said limit section and said extending section of said slide block, respectively.

4. The hinge as claimed in claim 2, wherein for each of said support modules, said pivot guide unit includes a first pivotal member and a second pivotal member that are pivotally connected to said seat bodies, respectively, and that are connected to each other to be pivotable relative to said seat bodies in a synchronous manner, said first pivotal member and said second pivotal member cooperating with each other to form said bearing surface and said oblique guide rail, and defining a receiving space therebetween, said slide block being disposed between said first pivotal member and said second pivotal member and received in said receiving space.

5. The hinge as claimed in claim 4, wherein for each of said support modules, said first pivotal member of said pivot guide unit of has a first connecting portion that is proximal to said fixed seat, and said second pivotal member of said pivot guide unit has a second connecting portion that is connected to said first connecting portion of said first pivotal member and that cooperates with said first connecting portion to prevent movement of said arm body of sliding pivot arm therebetween along the first direction.

6. The hinge as claimed in claim 5, wherein for each of said support modules, said oblique guide rail of said pivot guide unit is configured as a plurality of parallel rib-shaped protrusions that are formed on inner sides of said first pivotal member and said second pivotal member, and that extend obliquely with respect to said bearing surface, said oblique sliding portion of said slide block of said sliding unit being configured as a plurality of elongated grooves that are formed in said side surface of said block body, and that extend obliquely with respect to said bearing surface for receiving said rib-shaped protrusions of said oblique guide rail, respectively.

7. The hinge as claimed in claim 6, wherein for each of said support modules, said slide block of said sliding unit further has a case connecting portion that is connected to said block body, that is disposed outside of said receiving space of said pivot guide unit, and that is adapted to be connected to the respective one of the casings.

8. The hinge as claimed in claim 7, wherein for each of said support modules, said case connecting portion of said slide block of said sliding unit is connected to said second end surface of said block body of said slide block.

9. The hinge as claimed in claim 5, wherein for each of said support modules, said second connecting portion of said second pivotal member of said pivot guide unit is formed with a slot that is provided for said arm body of said sliding pivot arm to extend therethrough and for receiving said first connecting portion of said first pivotal member, such that said arm body of said sliding pivot arm is disposed between and linearly movable between said first connecting portion of first pivotal member and said second connecting portion of said second pivotal member.

* * * * *